(12) United States Patent
Weingaertner et al.

(10) Patent No.: US 12,095,124 B2
(45) Date of Patent: Sep. 17, 2024

(54) FUEL CELL SYSTEMS AND METHODS WITH IMPROVED FUEL UTILIZATION

(71) Applicant: Bloom Energy Corporation, San Jose, CA (US)

(72) Inventors: David Weingaertner, San Jose, CA (US); Michael Gasda, San Jose, CA (US); Martin Perry, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 17/938,718

(22) Filed: Oct. 7, 2022

(65) Prior Publication Data

US 2023/0146574 A1    May 11, 2023

Related U.S. Application Data

(60) Provisional application No. 63/278,477, filed on Nov. 11, 2021.

(51) Int. Cl.
| | |
|---|---|
| H01M 8/04089 | (2016.01) |
| H01M 8/04007 | (2016.01) |
| H01M 8/04082 | (2016.01) |
| H01M 8/0612 | (2016.01) |
| H01M 8/0668 | (2016.01) |

(52) U.S. Cl.
CPC ... *H01M 8/04097* (2013.01); *H01M 8/04074* (2013.01); *H01M 8/04201* (2013.01); *H01M 8/0618* (2013.01); *H01M 8/0668* (2013.01)

(58) Field of Classification Search
None
See application file for complete search history.

(56) References Cited

U.S. PATENT DOCUMENTS

| | | | |
|---|---|---|---|
| 2005/0164069 A1 | 7/2005 | Margiott et al. | |
| 2006/0251934 A1* | 11/2006 | Valensa | H01M 8/04126 429/513 |

(Continued)

OTHER PUBLICATIONS

Extended European Search Report Mailed Apr. 5, 2023 in corresponding European Application No. 22206758.9.

*Primary Examiner* — Haroon S. Sheikh
(74) *Attorney, Agent, or Firm* — THE MARBURY LAW GROUP PLLC

(57) ABSTRACT

A fuel cell system includes at least one hot box including a fuel cell stack and producing an anode exhaust product, at least one hydrogen pump, at least one product conduit fluidly connecting an anode exhaust product outlet of the hot box to an inlet of the at least one hydrogen pump, a compressed hydrogen product conduit connected to a compressed hydrogen product outlet of the at least one hydrogen pump, and at least one effluent conduit connected to an unpumped effluent outlet of the at least one hydrogen pump. Additional embodiments include a fuel cell system in which the anode exhaust product stream is provided to at least one carbon dioxide pump to generate a compressed carbon dioxide product and an unpumped effluent that may be recycled to the at least one hot box of the fuel cell system. In various embodiments, the fuel cell system may use or recapture essentially all of the hydrogen content and nearly all of the carbon content of the input fuel that is provided to the fuel cell system.

20 Claims, 6 Drawing Sheets

(56) References Cited

U.S. PATENT DOCUMENTS

| | | | |
|---|---|---|---|
| 2019/0140297 A1* | 5/2019 | Gasda | H01M 8/04776 |
| 2020/0303758 A1 | 9/2020 | Karuppaiah et al. | |
| 2020/0328445 A1* | 10/2020 | Weingaertner | H01M 8/1231 |
| 2021/0020974 A1 | 1/2021 | Ballantine et al. | |

* cited by examiner

US 12,095,124 B2

FUEL CELL SYSTEMS AND METHODS WITH IMPROVED FUEL UTILIZATION

FIELD

Aspects of this disclosure relate to fuel cell systems and methods of operating a fuel cell system.

BACKGROUND

Fuel cells, such as solid oxide fuel cells, are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

SUMMARY

An embodiment fuel cell system includes at least one hot box including a fuel cell stack and producing an anode exhaust product, at least one hydrogen pump, at least one product conduit fluidly connecting an anode exhaust product outlet of the hot box to an inlet of the at least one hydrogen pump, a compressed hydrogen product conduit connected to a compressed hydrogen product outlet of the at least one hydrogen pump, and at least one effluent conduit connected to an unpumped effluent outlet of the at least one hydrogen pump.

A further embodiment fuel cell system includes at least one hot box including a fuel cell stack and producing an anode exhaust product, at least one carbon dioxide pump, at least one product conduit fluidly connecting an anode exhaust product outlet of the hot box to an inlet of the at least one carbon dioxide pump, a compressed carbon dioxide product conduit connected to a compressed carbon dioxide product outlet of the at least one carbon dioxide pump, and at least one effluent conduit connected to an unpumped effluent outlet of the at least one carbon dioxide pump.

A further embodiment includes a method of operating a fuel cell system that includes providing a fuel inlet stream to at least one hot box of the fuel cell system, generating an anode exhaust product stream from the at least one hot box of the fuel cell system, providing the anode exhaust product stream to at least one hydrogen pump, generating a compressed hydrogen product and an unpumped effluent in the at least one hydrogen pump, and recycling at least a portion of the compressed hydrogen product to the at least one hot box of the fuel cell system.

A further embodiment includes a method of operating a fuel cell system that includes providing a fuel inlet stream to at least one hot box of the fuel cell system, generating an anode exhaust product stream from the at least one hot box of the fuel cell system, providing the anode exhaust product stream to at least one carbon dioxide pump, generating a compressed carbon dioxide product and an unpumped effluent in the at least one carbon dioxide pump, and recycling at least a portion of the unpumped effluent from the carbon dioxide pump to the at least one hot box of the fuel cell system.

BRIEF DESCRIPTION OF THE DRAWINGS

The accompanying drawings, which are incorporated herein and constitute part of this specification, illustrate example embodiments of the disclosure, and together with the general description given above and the detailed description given below, serve to explain the features of the disclosure.

DETAILED DESCRIPTION

The various embodiments are described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Figure 1:
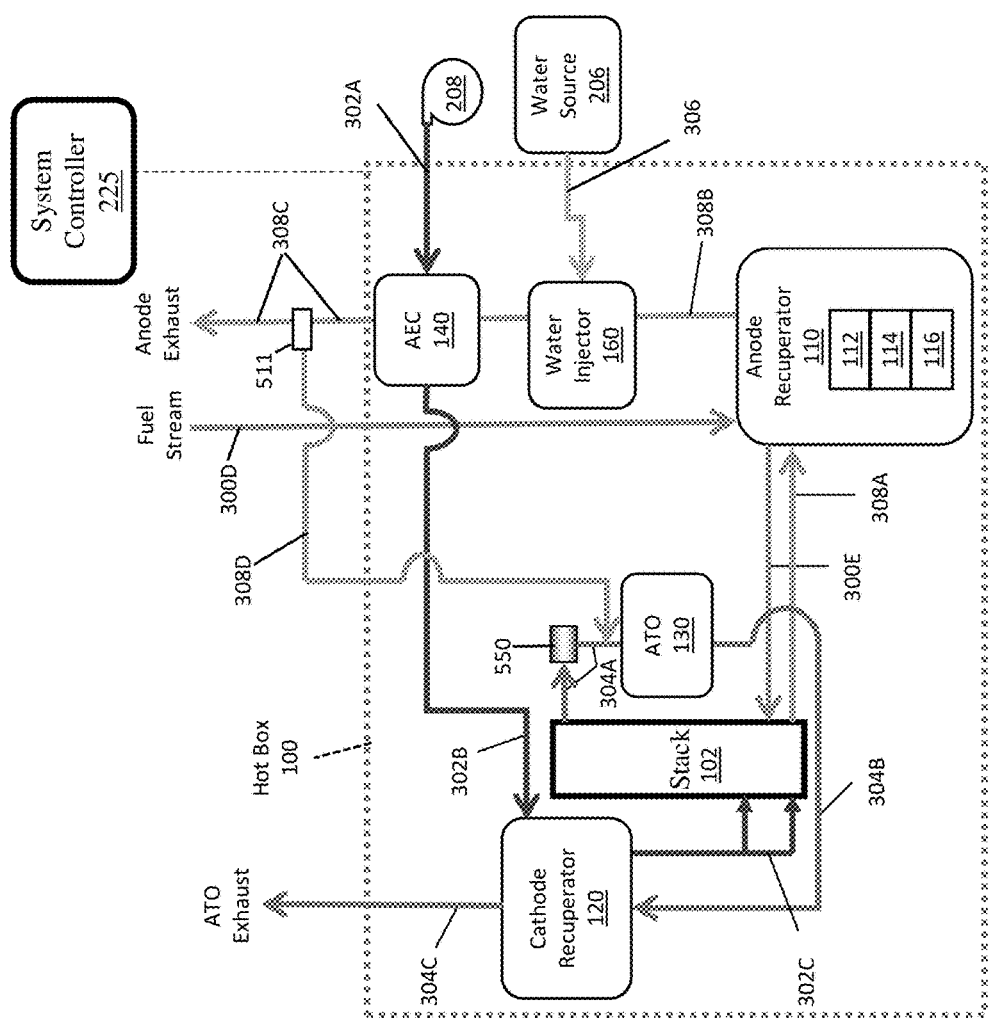
FIG. 1 is a schematic illustration of a hot box of a solid oxide fuel cell system, according to various embodiments.

FIG. 1 is a schematic representation of a hot box 100 of a fuel cell system 10, such as a solid oxide fuel cell (SOFC) system, according to various embodiments of the present disclosure. The hot box 100 may contain fuel cell stacks 102, such as a solid oxide fuel cell stacks (where one solid oxide fuel cell of the stack contains a ceramic electrolyte, such as yttria stabilized zirconia (YSZ) or scandia stabilized zirconia (SSZ), an anode electrode, such as a nickel-YSZ or Ni-SSZ cermet, and a cathode electrode, such as lanthanum strontium manganite (LSM)). The stacks 102 may be arranged over each other in a plurality of columns.

The hot box 100 may also contain an anode recuperator 110, a cathode recuperator 120, an anode tail gas oxidizer (ATO) 130, an anode exhaust cooler 140, a vortex generator 550, and a steam generator 160. The fuel cell system 10 may further include additional components, such as a system blower 208 (e.g., air blower), a water source 206, valve(s) 511 and/or fluid conduits 300D, 302A, 304C, 306 and 308G, as well as other components of the fuel cell system 10, that may be located outside or partially outside of the hotbox 102. However, the present disclosure is not limited to any particular location for each of the components with respect to the hotbox 102.

A fuel stream may enter the hot box 102 and flow to the anode recuperator 110 through fuel conduit 300D. The fuel stream may include a mixture of a hydrocarbon fuel, such as natural gas, recycled anode exhaust of the fuel cell system 10, and optionally recycled hydrogen product, as described in further detail below. The fuel stream may be heated in the anode recuperator 110 and may flow from the anode recuperator 110 to the stacks 102 through fuel conduit 300E.

The system blower 208 may be configured to provide an air stream (e.g., air inlet stream) to the anode exhaust cooler 140 through air conduit 302A. Air flows from the anode exhaust cooler 140 to the cathode recuperator through air conduit 302B. The air flows from the cathode recuperator 120 to the stacks 102 through air conduit 302C.

Anode exhaust generated in the stacks 102 is provided to the anode recuperator 110 through anode exhaust conduit 308A. The anode exhaust may contain unreacted fuel and may also be referred to herein as fuel exhaust. The anode exhaust located within the anode recuperator 110 may transfer heat to the incoming fuel stream flowing through the anode recuperator 110 to the stacks 102. The anode exhaust may be provided from the anode recuperator 110 to anode exhaust conduit 308B. The anode exhaust may flow through the anode exhaust conduit 308B to the anode exhaust cooler 140. Anode exhaust from the anode exhaust cooler 140 may exit the hot box 100 by anode exhaust conduit 308C. An anode recycle blower (not shown in FIG. 1) in fluid communication with anode exhaust conduit 308C may be configured to move anode exhaust though anode exhaust conduit 308C, as discussed in further detail below. In some embodiments, a splitter 511 may be configured to selectively provide a portion of the anode exhaust from the anode exhaust conduit 308C to anode exhaust conduit 308D. The splitter 511 may be, for example, a computer- or operator-controlled valve or any other suitable fluid splitting device, such as a passive splitter containing openings or slits in a fluid conduit. Anode exhaust conduit 308D may selectively redirect a portion of the anode exhaust exiting the anode exhaust cooler 140 through the anode exhaust conduit 308D to the ATO 130, such as during startup or other transient operating states of the SOFC system 10.

In the embodiment shown in FIG. 1, all of the anode exhaust in the hot box 100 passes through the anode exhaust cooler 140 before it exits the hot box 100 via anode exhaust conduit 308C. In other embodiments, described in further detail below, at least a portion of the anode exhaust may exit the hot box 100 before it passes through the anode exhaust cooler 140. For example, a portion of the anode exhaust stream may exit the hot box 100 via an anode exhaust conduit (not shown in FIG. 1) that may be located between the anode recuperator 110 and the anode exhaust cooler 140.

Cathode exhaust generated in the stacks 102 flows to the ATO 130 through exhaust conduit 304A. The vortex generator 550 may be disposed in exhaust conduit 304A and may be configured to swirl the cathode exhaust. Anode exhaust conduit 308D may be fluidly connected to cathode exhaust conduit 304A or the ATO 130, downstream of the vortex generator 550. The swirled cathode exhaust may mix with anode exhaust from anode exhaust conduit 308D before being provided to the ATO 130. The mixture may be oxidized in the ATO 130 to generate ATO exhaust. The ATO exhaust flows from the ATO 130 to the cathode recuperator 120 through exhaust conduit 304B. The ATO exhaust flows from the cathode recuperator and out of the hot box 100 through exhaust conduit 304C.

Water flows from a water source 206, such as a water tank or a water pipe, to the steam generator 160 through water conduit 306. The steam generator 160 injects water into anode exhaust conduit 308B. Heat from the anode exhaust provided to the exhaust conduit 308B from the anode recuperator 110 vaporizes the water to generate steam. The steam mixes with the anode exhaust to provide a humidified anode exhaust stream which flows from the anode exhaust conduit 308B through the anode exhaust cooler 140 and into the anode exhaust conduit 308C.

The system 10 may further include a system controller 225 configured to control various elements of the system 10. The controller 225 may include a central processing unit configured to execute stored instructions. For example, the controller 225 may be configured to control fuel and/or air flow through the system 10, according to fuel composition data. The system 10 may also include one or more fuel reforming catalysts 112, 114, and 116.

During operation, the stacks 102 generate electricity using the provided fuel and air, and generate the anode exhaust (i.e., fuel exhaust) and the cathode exhaust (i.e., air exhaust). The anode exhaust may contain hydrogen, water vapor, carbon monoxide, carbon dioxide, some unreacted hydrocarbon fuel such as methane, and other reaction by-products and impurities.

Figure 2:
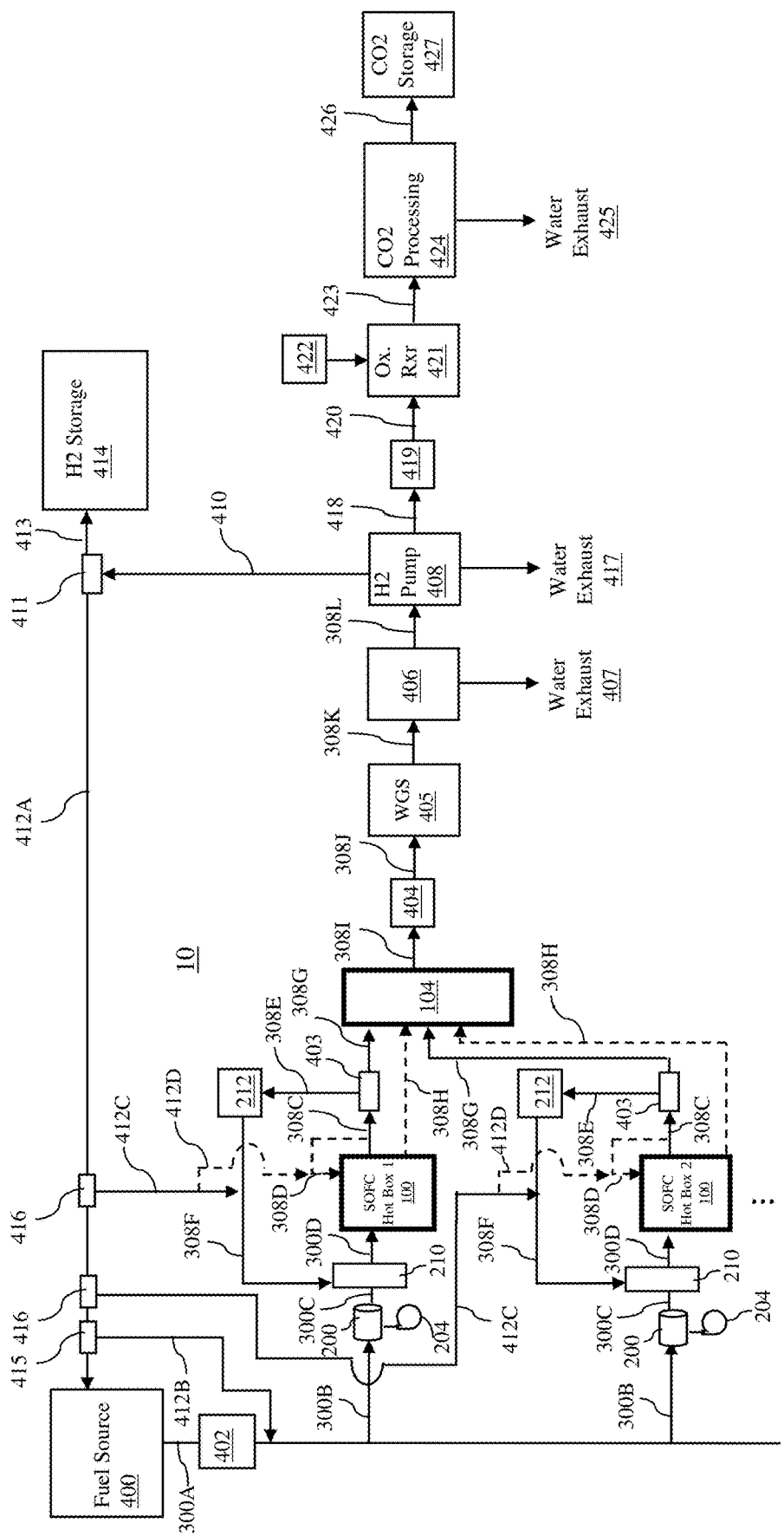
FIG. 2 is a schematic diagram of components of a fuel cell system according to an embodiment of the present disclosure.

FIG. 2 is a schematic diagram of components of a fuel cell system 10 according to embodiments of the present disclosure. The fuel cell system 10 may include at least one hot box 100, such as the hot box 100 described above with reference to FIG. 1. For example, a fuel cell system 10 may include n hot boxes 100, where n is an integer between 1 and 100, such as 2 to 10, for example 4 to 8. The fuel cell system 10 illustrated in FIG. 2 includes two hot boxes 100, although a fuel cell system according to various embodiments may include a greater or lesser number of hot boxes 100.

FIG. 2 schematically illustrates the flows of fuel and anode exhaust throughout the fuel cell system 10 according to an embodiment of the present disclosure. Referring to FIG. 2, the system 10 may be coupled to a fuel source 400 that may provide the fuel cell system 10 with a suitable fuel. The fuel source 400 may include one or more fuel storage containers (e.g., fuel tank(s) or similar vessels) that may be located on the same site as the system 10. Alternatively, the fuel source 400 may provide fuel to the system 10 from a remote source, such as over a gas utility line. The fuel provided to the fuel cell system 10 from the fuel source 400 may include any suitable hydrocarbon fuel, including but not limited to methane, natural gas which contains methane with hydrogen and other gases, propane or other biogas, or a mixture of a carbon fuel, such as carbon monoxide, oxygenated carbon containing gas, such as methanol, or other carbon containing gas with a hydrogen containing gas, such as water vapor, $H_2$ gas or their mixtures. For example, the mixture may comprise syngas derived from coal or natural gas reformation.

In some embodiments, the fuel from the fuel source 400 may undergo one or more pre-processing steps before being provided to the hot boxes 100 of the fuel cell system 10. For example, a fuel inlet conduit 300A coupled to the fuel source 400 may provide the fuel to one or more pre-processing units 400, such as one or more desulfurizers, to remove sulfur and/or other undesirable impurities from the fuel stream. The pre-processed fuel may then flow through fuel conduits 308B to each of the hot boxes 100.

In some embodiments, each hot box 100 may additionally include a catalytic partial oxidation (CPOx) reactor 200, a mixer 210, a CPOx blower 204 (e.g., air blower), and an anode recycle blower 212, which may be disposed outside of the hot box 100. However, the present disclosure is not limited to any particular location for each of the components with respect to the hot box 100.

Referring again to FIG. 2, each CPOx reactor 200 that is associated with a respective hot box 100 may receive an inlet fuel stream through a fuel conduit 308B. The CPOx blower 204 may provide air to the CPOx reactor 204. The fuel and/or air from the CPOx reactor 200 may be provided to the mixer 210 by fuel conduit 300C. The mixer 210 may be configured to mix the fuel stream with recycled anode exhaust from the hot box 100. This mixture of fresh fuel and recycled anode exhaust may then be provided to the hot box 100 via fuel conduit 300D as described above with reference to FIG. 1.

The anode exhaust (i.e., fuel exhaust) from each hot box 100 may exit the hot box 100 through anode exhaust conduit 308C, as discussed above with reference to FIG. 1. A splitter 511 (see FIG. 1) may selectively redirect a portion of the anode exhaust located in anode exhaust conduit 308C back into the hot box 100 via anode exhaust conduit 308D. As previously discussed, the portion of the anode exhaust that is redirected through anode exhaust conduit 308D may be provided to the ATO 130 of the hot box 100 during startup or other transient operating conditions.

In the embodiment shown in FIG. 2, the remaining anode exhaust located in anode exhaust conduit 308C may be provided to a splitter 403. The splitter 403 may be, for example, a computer- or operator-controlled valve or any other suitable fluid splitting device, such as a passive splitter containing openings or slits in a fluid conduit. A first portion of the anode exhaust may be provided from the splitter 403 to the anode recycle blower 212 via anode exhaust conduit 308E. The anode recycle blower 212 may be any suitable fluid (e.g., gas) blower, pump, compressor, or the like. The first portion of the anode exhaust may be provided from the anode recycle blower 212 to the mixer 210 by anode exhaust conduit 308F. As discussed above, the recycled anode exhaust may mix with fresh fuel in the mixer 210 before reentering the hot box 100 via fuel conduit 300D. As used herein, the portion of the anode exhaust that exits the hot box 100 via the anode exhaust conduit 308C and is recycled by the anode recycle blower 212 to mix with fresh fuel in the mixer 210 and reenters the hot box 100 via fuel conduit 300D may be referred to as the "anode recycle", and the fluid pathway of the anode recycle between the anode exhaust conduit 308C at the outlet of the hot box 100 and the fuel conduit 300D at the inlet of the hot box 100 may be referred to as the "anode recycle loop."

A second portion of the anode exhaust may be provided from the splitter 403 to a manifold 104 via anode exhaust conduit 308G. The manifold 104 may be connected to plural hot boxes 100 of the system 10, including, in some embodiments, to all of the hot boxes 100 of the system 10, by respective anode exhaust conduits 308G. Alternatively, the system 10 may include multiple manifolds 104, where each manifold 104 may be connected to a sub-set of hot boxes 100 of the system 10. In various embodiments, anode exhaust streams from plural hot boxes 100 of the system 10 may be combined in the manifold 104.

Referring once again to FIG. 2, in some embodiments, each of the hot boxes 100 may include an optional additional anode exhaust conduit 308H that is in fluid communication with the manifold 104. In some embodiments, the optional additional anode exhaust conduit 308H may provide a direct fluid pathway between the hot box 100 and the manifold 104. In some embodiments, the anode exhaust within the optional anode exhaust conduit 308H may exit the hot box 100 upstream of the anode exhaust cooler 104 (see FIG. 1). For example, the hot box 100 may include a splitter (e.g., a valve, a passive splitter, or the like) within anode fluid conduit 308B located between the anode recuperator 110 and the anode exhaust cooler 140 in the hot box 100 shown in FIG. 1. The splitter may divert a portion of the anode exhaust stream from anode exhaust conduit 308B to optional anode exhaust conduit 308H such that this portion of the anode exhaust stream may be provided directly to the manifold 104 shown in FIG. 2. The remaining portion of the anode exhaust stream may proceed through the anode exhaust cooler 140 and into anode exhaust conduit 308C as described above.

Accordingly, in some embodiments, the anode exhaust provided to the manifold 104 may include a first component of anode exhaust that exits the hot box 100 at the outlet of the anode exhaust cooler 140 and flows through anode exhaust conduit 308C, splitter(s) 511 and/or 403, and anode exhaust conduit 308G to the manifold 104, and a second component of anode exhaust that exits the hot box 100 upstream of the anode exhaust cooler 140 and flows through anode exhaust conduit 308H to the manifold 104. Accordingly, the second component of the anode exhaust may bypass the anode exhaust cooler 140, and therefore may have a higher temperature than the first component of the anode exhaust that flows through the anode exhaust cooler 140.

In some embodiments, the mixture of anode exhaust that is received in the manifold 104 may be variable, such that during certain times, a greater portion of the anode exhaust, including all of the anode exhaust, that is provided from one or more hot boxes 100 to the manifold 104 may be the first component of the anode exhaust provided via anode exhaust conduit 308G (i.e., anode exhaust that has passed through the anode exhaust cooler 140 of the hot box 100), and at other times, a greater portion of the anode exhaust, including all of the anode exhaust, that is provided from the one or more hot boxes 100 to the manifold 104 may be the second component of the anode exhaust provided via anode exhaust conduit 308H (i.e., anode exhaust that has bypassed the anode exhaust cooler 140 of the hot box 100). The system controller 225 as described above with reference to FIG. 1 may be used to control the mixture of the first and second components of the anode exhaust that is provided to the manifold 104 from each of the hot boxes 100.

In some embodiments, the first component of the anode exhaust that is provided to the manifold 104 via anode exhaust conduit 308G (i.e., anode exhaust that has passed through the anode exhaust cooler 140 of the hot box 100), may have a temperature of between about 100° C. and 180° C., and the second component of the anode exhaust that is provided to the manifold 104 via anode exhaust conduit 308H (i.e., anode exhaust that bypasses the anode exhaust cooler 140 of the hot box 100) may have a temperature of between about 300° C. and 500° C.

Accordingly, by providing an anode exhaust stream that includes a mixture of a lower-temperature first component of anode exhaust that passes through the anode exhaust cooler 140 of a hot box 100 and a higher-temperature second component of anode exhaust that bypasses the anode exhaust cooler 140, the temperature of the anode exhaust in the manifold 104 may be controllably varied. In some embodiments, the temperature of the anode exhaust in the manifold 104 may be controlled to include more heat than is required for subsequent $H_2$ recovery and/or $CO_2$ separation processes as described in further detail below. Providing an anode exhaust stream containing excess heat may provide an advantage in that cooling of the anode exhaust as needed for one or more subsequent processes may consume less parasitic power than would be required to heat the anode exhaust for these same processes.

Referring again to FIG. 2, the combined anode exhaust streams from multiple hot boxes 100 may be provided from the manifold 104 to an anode exhaust conditioning unit 404 via anode exhaust conduit 308I. The anode exhaust conditioning unit 404 may be configured to modify a temperature of the anode exhaust stream to make the anode exhaust stream suitable for introduction to a water gas shift (WGS) reactor 405 located downstream of the anode exhaust conditioning unit 404. The anode exhaust conditioning unit 404 may include one or more heat transfer devices, such as one or more heat exchangers and/or condensers. Other suitable heat transfer devices are within the contemplated scope of the disclosure. In some embodiments, where the temperature of the anode exhaust stream is greater than an operating temperature range of the WGS reactor, the one or more heat transfer devices may be cooled by a cooling medium, such as cooling water and/or air, in order to reduce a temperature of the anode exhaust stream flowing through the anode exhaust conditioning unit 404. In other embodiments, where the temperature of the anode exhaust stream is lower than an operating temperature range of the WGS reactor 405, the one or more heat transfer devices may transfer heat to the anode exhaust stream in order to increase a temperature of the anode exhaust stream flowing through the anode exhaust conditioning unit 404. Heat transfer to the anode exhaust stream may be achieved by heat exchange with a fluid medium having a higher temperature than the anode exhaust stream (e.g., a combustion gas), or by using a heater, such as an electric heater, to directly heat the anode exhaust stream. In various embodiments, the temperature of the anode exhaust exiting the anode exhaust conditioning unit 404 may be between about 150° C. and 300° C., such as between about 200° C. and 250° C.

Referring again to FIG. 2, the anode exhaust stream may be provided from the anode exhaust conditioning unit 404 to the WGS reactor 405 via anode exhaust conduit 308J. The WGS reactor 405 may be configured to convert CO and $H_2O$ in the anode exhaust to $CO_2$ and $H_2$ using a water-gas shift reaction. In various embodiments, the WGS reactor 405 may be a low temperature WGS reactor 405 and may have a nominal operating temperature between about 200° C. and 250° C. Following the water-gas shift reaction, the anode exhaust stream may include primarily $H_2O$, $CO_2$ and $H_2$, with smaller amounts of CO, $N_2$ and other impurities.

The anode exhaust stream may then be provided from the WGS reactor 405 to a condenser 406 via anode exhaust conduit 308K. The condenser 406 may be cooled by a cooling medium, such as cooling water and/or air to condense water vapor to liquid water and to reduce the temperature of the anode exhaust stream to below 100° C., such as between 50° C. and 80° C. (e.g., ~70° C.). The liquid water may be removed from the condenser 406 via a water exhaust conduit 407, and the liquid water in conduit 407 may optionally be purified and/or reused. In various embodiments, water knockout may be integrated into the design of the condenser 406 or included as a separate component downstream of the condenser 406. The partially dehydrated anode exhaust stream may be provided from the condenser 406 to at least one hydrogen pump 408 via anode exhaust conduit 308L.

In various embodiments, the partially hydrogenated anode exhaust stream that is provided to the at least one hydrogen pump 408 may include at least about a 40% molar fraction of $H_2O$, such as a 50-60% (e.g., ~56%) molar fraction of $H_2O$, at least about a 20% molar fraction of $CO_2$, such as a 25-35% (e.g., ~29%) molar fraction of $CO_2$, at least about a 10% molar fraction of $H_2$, such as a 10-20% (e.g., ~14%) molar fraction of $H_2$, a less than 1% molar fraction of CO, and a less than 1% molar fraction of $N_2$. Depending on the tolerance of the at least one hydrogen pump 408 to CO, in some embodiments, the molar fraction of CO in the anode exhaust stream may be between 0.5% and 1%. This may enable relatively higher temperature operation of the WGS reactor 405 and may enable a larger thermal window of operation for the WGS reactor 405.

The at least one hydrogen pump 408 may include an electrochemical hydrogen pump or pumps. The at least one electrochemical hydrogen pump 408 may include a hydrogen pump and a separator which electrochemically pumps pure hydrogen through a polymer membrane upon application of a current or voltage across the membrane. In various embodiments, the at least one electrochemical hydrogen pump 408 may include a high-pressure hydrogen separation and compression system available from Skyre, Inc. under the name "H2RENEW™" and/or described in U.S. Pat. Nos. 10,756,361 and/or 10,648,089. The at least one hydrogen pump 408 may include multiple pumps (e.g., plural separation membrane stacks) connected in series and/or in parallel to enable a higher overall recovery fraction of hydrogen and/or a higher throughput. In some embodiments, the at least one hydrogen pump 408 may be tolerant to at least about 0.5% molar fraction of CO, including up to about 1% molar fraction of CO, in the dehydrated anode exhaust stream provided to the at least one hydrogen pump 408.

In one embodiment, the at least one hydrogen pump 408 may recover greater than 80% of the hydrogen in the dehydrated anode exhaust stream and output greater than 99% pure compressed hydrogen product through a compressed hydrogen product conduit 410. For example, the compressed hydrogen product may be at least 99.99% pure (i.e., dry) hydrogen which may be pressurized to a pressure 1 psig to 10,000 psig, such as 15 psig to 2,000 psig, for example 15 psig to 150 psig. In various embodiments, the compressed hydrogen product produced by the at least one hydrogen pump 408 may be suitable for use or storage without additional mechanical compression or drying.

Referring again to FIG. 2, compressed hydrogen product in compressed hydrogen product conduit 410 may be provided to a splitter 411. The splitter 411 may be, for example, a computer- or operator-controlled valve or any other suitable fluid splitting device, such as a passive splitter containing openings or slits in a fluid conduit. A first portion of the compressed hydrogen product may be provided from the splitter 403 to a hydrogen recycle conduit 412A for further use in the fuel cell system 10. A second portion of the compressed hydrogen product may be provided from the splitter 403 to a hydrogen storage conduit 413 for storage and/or distribution or sale of the compressed hydrogen product. In some embodiments, the hydrogen storage conduit 413 may provide the compressed hydrogen product directly to one or more hydrogen storage containers 414 connected to the hydrogen storage conduit 413. Alternatively, one or more compressors (not shown in FIG. 2) may be coupled to the hydrogen storage conduit and may be configured to further compress the compressed hydrogen product to a pressure suitable for storage in the one or more hydrogen storage containers 414.

In various embodiments, hydrogen recycle conduit 412A may be used to provide compressed hydrogen product to one or more locations in the fuel cell system 10. In some embodiments, the hydrogen recycle conduit 412A may provide at least a portion of the compressed hydrogen product to the fuel source 400, which may be, for example, a natural gas supply.

Alternatively, or in addition, in some embodiments, at least a portion of the compressed hydrogen product may be provided to the inlet fuel stream for the fuel cell system 10. In some embodiments, the compressed hydrogen product may be provided to the inlet fuel downstream of the one or more pre-processing units 400 (e.g., desulfurizer(s)) of the fuel cell system 10. In one embodiment shown in FIG. 2, a splitter 415 may direct at least a portion of the compressed hydrogen product from hydrogen recycle conduit 412A to hydrogen recycle conduit 412B, which may provide the at least a portion of the compressed hydrogen product to fuel inlet conduit 300A.

Alternatively, or in addition, in some embodiments, at least a portion of the compressed hydrogen product may be provided to the anode recycle loops of one or more of the hot boxes 100. In various embodiments, compressed hydrogen product may be provided to the anode recycle loops of all of the hot boxes 100 of the fuel cell system 10. In one embodiment shown in FIG. 2, one or more splitters 416 may direct at least a portion of the compressed hydrogen product from hydrogen recycle conduit 412A to one or more hydrogen recycle conduits 412C. Each of the anode recycle conduits 412C may be fluidly connected to the anode recycle loop of a respective hot box 100. The compressed hydrogen product provided to the anode recycle loop of a hot box 100 may mix with both the anode recycle and fresh fuel in the anode recycle loop, and may enter the hot box 100 via fuel conduit 300D.

In some embodiments, at least a portion of the compressed hydrogen product may also be provided to the ATO 130 of one or more hot boxes 100 of the fuel cell system 10. In embodiments, compressed hydrogen product may be provided to the ATO 130 during startup of the hot box 100 or other transient conditions, and may be used for thermal management of the hot boxes 100. In the embodiment shown in FIG. 2, one or more hydrogen recycle conduits 412D may selectively redirect a portion of the compressed hydrogen product to the ATO 130 of one or more respective hot boxes 100. In some embodiments, the hydrogen recycle conduits 412D may be fluidly coupled to anode exhaust conduits 308D for directing compressed hydrogen product to the respective ATOs 130. By providing hydrogen to ATO 130, the temperature of hot box 100 is maintained at a near constant temperature, or as near to constant as is feasible or practical. Given the other changes (e.g., ambient temperature changing, purposeful air flow changes, etc.), there is no predetermined flow control of the feed stream to ATO 130. In some configurations, a proportional solendoid valve may be used to control the flow to +/−3-5%. Other configurations may achieve further control of the the flow (e.g. +/−0.5%), but such other configurations are expensive.

In embodiments, the compressed hydrogen product may be sufficiently pure (i.e., dry) that it may be recycled for use in the fuel cell system 10 without requiring any additional processing or conditioning. In addition, in some embodiments the dry compressed hydrogen product may be provided to various components/locations of the fuel cell system 10 without requiring the conduits 412A, 412B, 412C, 412D carrying the compressed hydrogen product to be traced and insulated to avoid water condensation. The dry compressed hydrogen product may also not produce condensation in unwanted locations of the fuel cell system 10, such as in desulfurization tanks.

In instances in which the compressed hydrogen product is not sufficiently dry for use in the fuel cell system 10 or a component thereof, a refrigerated condenser may optionally be used to further reduce the water content of the compressed hydrogen product before the compressed hydrogen product is used in the fuel cell system 10.

In various embodiments, the system controller 225 (see FIG. 1) may control the amount of compressed hydrogen product provided to various locations in the fuel cell system 10 and/or to the one or more hydrogen storage containers 414. In one non-limiting example, during steady-state operation of the fuel cell system 10, all or nearly all of the compressed hydrogen product may be provided to the hot boxes 100 of the fuel cell system 10. Any excess compressed hydrogen product not required for operation of the fuel cell system 10 may be provided to the one or more hydrogen storage containers 414. An advantage of recycling the majority of the compressed hydrogen product to the fuel cell system 10 is that the need to meet precise and high fuel utilization targets for the fuel cell system 10 may be lessened as more hydrogen product is recycled as a fuel. With the provision of a relatively large quantity of recycled hydrogen product, lower per pass utilization can still support a high overall fuel utilization for the fuel cell system 10. In addition, by lowering the fuel utilization of the fuel cell system 10 as desired, the quantity of hydrogen product that is provided to the one or more hydrogen storage containers 414 may be increased.

Referring again to FIG. 2, the unpumped effluent from the at least one hydrogen pump 408 may contain mainly water (e.g., water vapor and/or liquid water) and carbon dioxide. The unpumped effluent may also contain a small amount of hydrogen that was not separated from anode exhaust, as well as smaller amounts of carbon monoxide, nitrogen, and other impurities. For example, the unpumped effluent may contain less than a 10% molar fraction of $H_2$, such as 0-5% molar fraction of $H_2$, a 0-1% molar fraction of CO, and a 0-1% molar fraction of nitrogen. Liquid water may optionally be removed from the at least one hydrogen pump 408 via a water exhaust conduit 417, and the liquid water in conduit 417 may optionally be purified and/or reused. The unpumped gaseous effluent from the at least one hydrogen pump 408 may be provided from the at least one hydrogen pump 408 to effluent conduit 418.

In some embodiments, the effluent from the at least one hydrogen pump may optionally be fed from effluent conduit 418 to a blower 419, which may be any suitable fluid (e.g., gas) blower, pump, compressor, or the like. The blower 419 may "pull" the unpumped effluent from the at least one hydrogen pump 408. The blower 419 may further compress the effluent, such as to a pressure between 2-15 psig. The heat of compression of the unpumped effluent may raise the temperature of the unpumped effluent. This may pre-heat the effluent for a subsequent catalytic or thermal reaction configured to oxidize some or all of the residual $H_2$ and CO in the effluent. The compression of the effluent may also decouple the compression from $CO_2$ compression, dehydration and/or liquification processes that may subsequently be performed. In embodiments in which optional blower 419 is present, the compressed effluent from the blower 419 may be provided to effluent conduit 420. In some instances, adjusting a large compressor (i.e., varying the compressor speed) that has a high compression ratio may be difficult. For example, small changes in compressor speed may pull too much or too little gas from the pipe, causing pressure disturbances upstream. However, a small blower has a lower gain, and small adjustments in speed have small changes in flowrate and inlet pressure. In some instances, a small storage volume downstream of a blower may be used to provide some capacitance to the system for pressure control. For example, downstream storage volume may be on the order of one minute of residence time.

In various embodiments, the compressed effluent from the blower 419 may optionally be provided to an oxidation reactor 421 via effluent conduit 420. The oxidation reactor 421 may be a catalytic or a thermal oxidation reactor that may be configured to reduce or eliminate the residual $H_2$ and CO content from the effluent prior to subsequent $CO_2$ processing steps. An oxygen source 422 may be coupled to the oxidation reactor 421 and may provide oxygen for the oxidation reaction. In some embodiments, the oxygen source 422 may include an air blower. Alternatively, or in addition, the oxygen source 422 may be an oxygen generator or an oxygen storage apparatus that may provide purified oxygen for the oxidation reaction. In embodiments in which an optional oxidation reactor 421 is present, the effluent from the oxidation reactor 421, which may be composed substantially entirely of $H_2O$ and $CO_2$, may be provided to effluent conduit 423.

In some embodiments, the system 10 may optionally include a carbon dioxide processing device 424 that may be operatively connected to an effluent conduit 418, 420 and/or 423 containing effluent product from the at least one hydrogen pump 408. The carbon dioxide processing device 424 may operate to compress and/or cool the effluent stream received from the at least one hydrogen pump 408, which may optionally be compressed by blower 419 and/or undergo an oxidation reaction in oxidation reactor 421. The optional carbon dioxide processing device 424 may be a condenser and/or dryer configured to remove water from the effluent stream. In some embodiments, the optional carbon dioxide processing device 424 may also convert the effluent stream into a liquified $CO_2$ product. The water that is removed from the effluent stream may optionally be removed from the carbon dioxide processing device 424 via a water exhaust conduit 425 for optional purification and/or reuse. The remaining portion of the effluent stream, which may include purified or pure $CO_2$, may be provided to one or more $CO_2$ storage containers 427 via conduit 426 for storage and/or sequestration of the $CO_2$, or may be used for chemical processes, beverage carbonation, etc. In some embodiments, the one or more $CO_2$ storage containers may include one or more cryogenic storage devices configured to convert the $CO_2$ into dry ice for storage.

Figure 3:
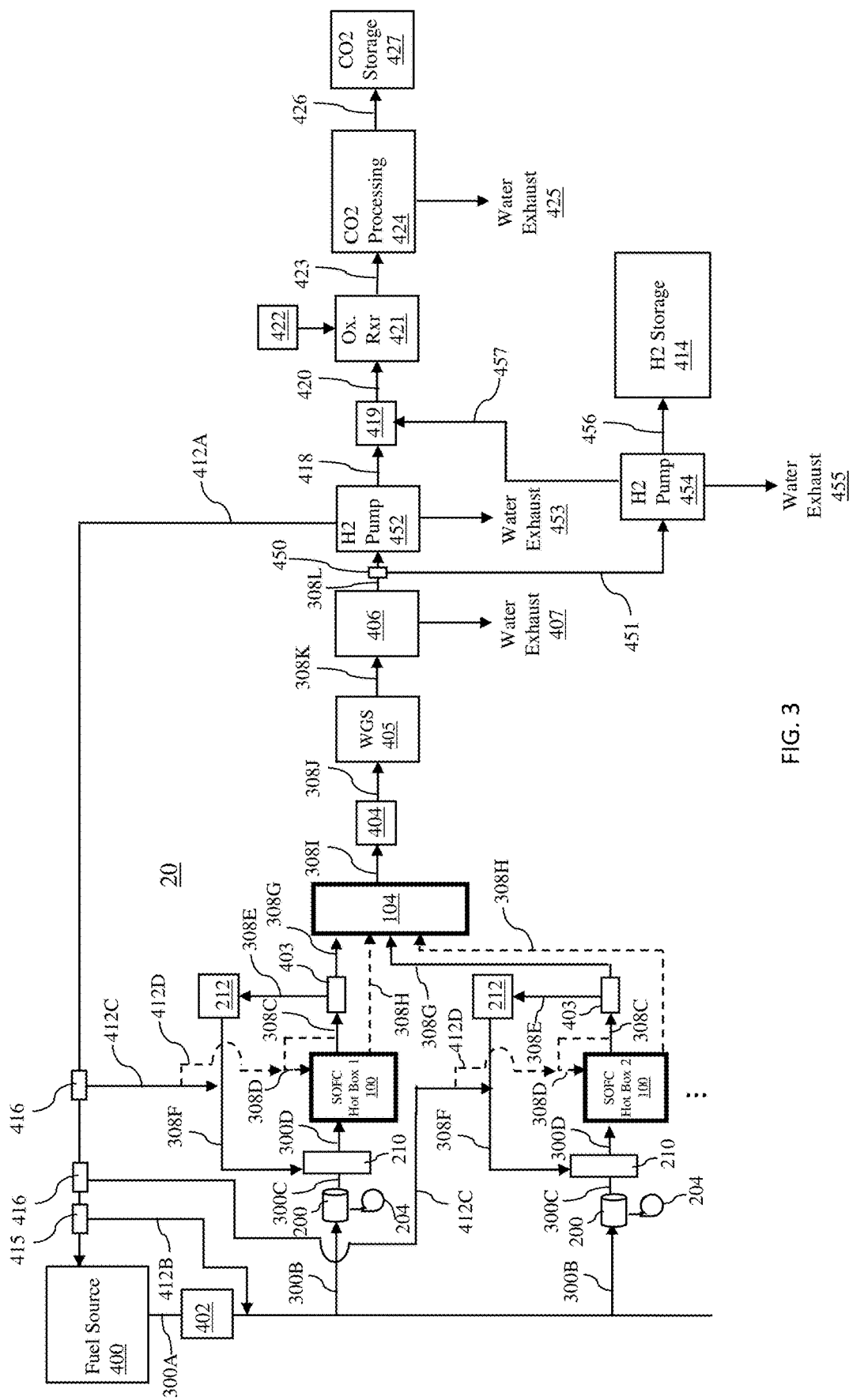
FIG. 3 is a schematic diagram of components of a fuel cell system according to another embodiment of the present disclosure.

FIG. 3 schematically illustrates a fuel cell system 20 according to another embodiment of the present disclosure. The fuel cell system 20 of FIG. 3 may be similar to fuel cell system 10 described above with reference to FIG. 2. Thus, repeated discussion of like components is omitted for brevity. The fuel cell system 20 of FIG. 3 may differ from the fuel cell system 10 of FIG. 2 in that lower pressure and higher pressure hydrogen pumps may be used to recover hydrogen product.

In particular, referring to FIG. 3, a splitter 450 (e.g., a valve, a passive splitter, or the like) located in anode exhaust conduit 308L may direct a portion of the partially hydrated anode exhaust stream to anode exhaust conduit 451. The remaining portion of the partially hydrated anode exhaust stream in anode exhaust conduit 308L may be provided to at least one low pressure hydrogen pump 452. The at least one low pressure hydrogen pump 452 may be configured to pump hydrogen that is separated from the anode exhaust stream to a relatively low pressure (e.g., 1-150 psig). In various embodiments, the at least one low pressure hydrogen pump 452 may pump the hydrogen to a pressure that is suitable for use in the fuel cell system 20. The compressed hydrogen product from the at least one low pressure hydrogen pump 452 may be provided to hydrogen recycle conduit 412A for further use in the fuel cell system 20 as described above with reference to FIG. 2. The remaining effluent from the at least one low pressure hydrogen pump 452 may be provided to effluent conduit 418, and may proceed to the optional blower 419, the optional oxidation reactor 421, and the optional carbon dioxide processing device 424 for separation of $CO_2$ as described above with reference to FIG. 2. Liquid water from the effluent may optionally be recovered via water exhaust conduit 453.

Referring again to FIG. 3, the portion of the partially hydrated anode exhaust stream located within anode exhaust conduit 451 may be provided to at least one high pressure hydrogen pump 454. The at least one high pressure hydrogen pump 454 may be configured to pump hydrogen that is separated from the anode exhaust stream to a relatively high pressure (e.g., 200 to 10,000 psig). In various embodiments, the at least one high pressure hydrogen pump 452 may pump the hydrogen to a pressure that is suitable for purposes of hydrogen storage and/or commercial sale of the purified hydrogen product. The compressed hydrogen product from the at least one high pressure hydrogen pump 454 may be provided to one or more hydrogen storage containers 414 via hydrogen product conduit 456. The remaining gaseous effluent from the at least one high pressure hydrogen pump 454 may be provided to effluent conduit 457, and liquid water from the effluent may optionally be recovered via water exhaust conduit 453. In some embodiments, effluent conduit 457 may provide the effluent from the at least one high pressure hydrogen pump 454 to the optional blower 419, the optional oxidation reactor 421, and the optional carbon dioxide processing device 424 for separation of $CO_2$ as described above with reference to FIG. 2.

In general, hydrogen product intended for storage and/or commercial sale may require a higher degree of pressurization than the hydrogen product that is recycled for use in the fuel cell system 20. In various embodiments, by providing at least one low pressure hydrogen pump 452 and at least one high pressure hydrogen pump 454 that may process the anode exhaust stream in parallel, the compressed hydrogen product recovered from the anode exhaust of the fuel cell system 20 may be optimized for different uses. In some embodiments, one or more buffer tanks (not shown in FIG. 3) may be provided upstream of the at least one low pressure hydrogen pump 452 and/or the at least one high pressure hydrogen pump 454 to mitigate against fluctuations in the flow rates of the parallel anode exhaust streams feeding the respective hydrogen pumps 452, 454.

Accordingly, the fuel cell systems 10, 20 shown in FIGS. 1-3 may use or recapture essentially all of the hydrogen content and essentially all of the carbon content of the input fuel that is provided to the fuel cell system 10, 20. This may provide increased fuel utilization for the fuel cell systems 10, 20.

Figure 4:
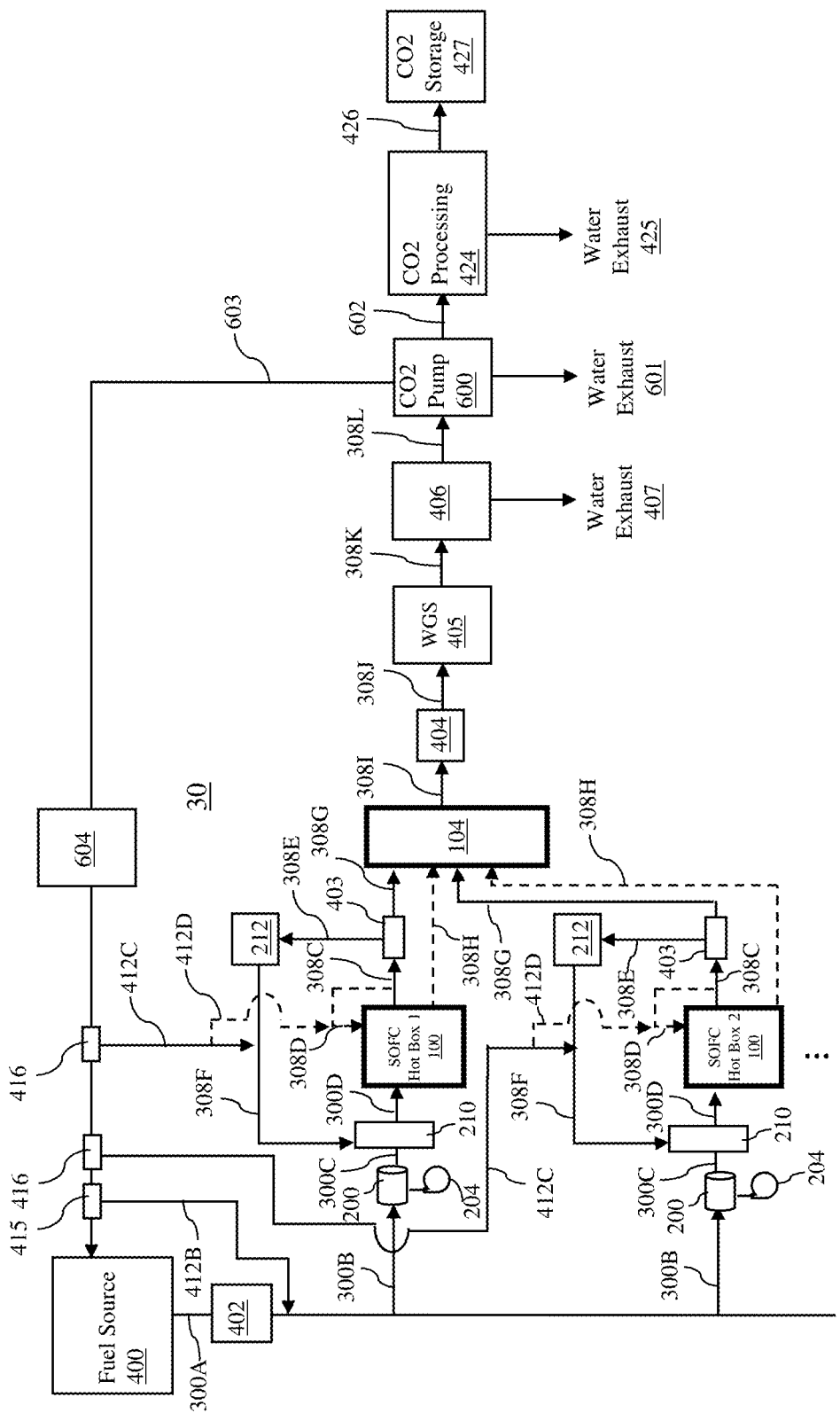
FIG. 4 is a schematic diagram of components of a fuel cell system according to yet another embodiment of the present disclosure.

FIG. 4 schematically illustrates a fuel cell system 30 according to another embodiment of the present disclosure. The fuel cell system 30 of FIG. 4 may be similar to fuel cell systems 10 and 20 described above with reference to FIGS. 2 and 3. Thus, repeated discussion of like components is omitted for brevity. The fuel cell system 30 of FIG. 4 may differ from the fuel cell systems 10 and 20 of FIGS. 2 and 3 in that a carbon dioxide pump may be used to separate at least a portion of the $CO_2$ from the anode exhaust stream.

Referring to FIG. 4, at least one carbon dioxide pump 600 may be located downstream of the water gas shift (WGS) reactor 405 and the condenser 406 in the anode exhaust stream from the hot boxes 100 of the fuel cell system 30. The condenser 406 may be configured to condense water vapor to liquid water and to reduce the temperature of the anode exhaust stream such that the temperature and/or water content of the anode exhaust stream may be within the operating range(s) of the carbon dioxide pump 600. Liquid water that is condensed from the anode exhaust stream may be removed via water exhaust conduit 407. Anode exhaust conduit 308L may provide the partially dehydrated anode exhaust stream from the condenser 406 to an inlet of the at least one carbon dioxide pump 600.

The at least one carbon dioxide pump 600 may include an electrochemical carbon dioxide pump or pumps. The at least one electrochemical carbon dioxide pump 600 may be configured to pump $CO_2$ from the lower-pressure anode exhaust stream to a higher-pressure, nearly pure $CO_2$ product which may also contain water. In some embodiments, the at least one electrochemical carbon dioxide pump may include a scrubber and a separator (i.e., concentrator) that electrochemically pumps carbon dioxide through a polymer membrane upon application of a current or voltage across the membrane. In various embodiments, the at least one electrochemical carbon dioxide pump 600 may include a high-pressure carbon dioxide separation and compression system available from Skyre, Inc. under the name "CO2RENEW™" and/or described in U.S. Patent Application Publication No. 2020/0222852. The at least one carbon dioxide pump 600 may include multiple pumps (e.g., plural separation membrane stacks) connected in series and/or in parallel to enable a higher overall recovery fraction of $CO_2$ and/or a higher throughput.

In one embodiment, the at least one carbon dioxide pump 600 may recover at least 70%, such as 70-90% or more, of the $CO_2$ present in the dehydrated anode exhaust stream. In some embodiments, the at least one carbon dioxide pump 600 may pressurize the separated $CO_2$ product to a pressure between 1 psig and 5,000 psig, such as 1-5 psig, 5-150 psig, or 150-5,000 psig. In some embodiments, the compressed $CO_2$ product produced by the at least one carbon dioxide pump 600 may be suitable for use, storage, or sequestration without additional mechanical compression.

In some embodiments, the compressed $CO_2$ product from the at least one carbon dioxide pump 600 may be provided to a carbon dioxide processing device 424 via conduit 602. The carbon dioxide processing device 424 may remove any residual water from the compressed $CO_2$ product, such as by thermal swing adsorption (TSA) and/or pressure swing adsorption (PSA). Water that is removed from the compressed $CO_2$ product may optionally be removed via a water exhaust conduit 425 for optional purification and/or reuse. The compressed $CO_2$ product may optionally undergo further compression to pressurize the $CO_2$ product to a pressure that is suitable for storage, use and/or sequestration. In some embodiments, the compressed $CO_2$ product may be liquified or solidified into dry ice. Following processing by the carbon dioxide processing device 424, the compressed $CO_2$ product, which may include purified or pure $CO_2$, may be provided to one or more $CO_2$ storage containers 427 via conduit 426 for storage and/or sequestration of the $CO_2$, or may be used for chemical processes, beverage carbonation, etc.

Referring again to FIG. 4, the unpumped effluent from the at least one carbon dioxide pump 600 may contain hydrogen, water (e.g., water vapor and/or liquid water), carbon dioxide that was not separated from the anode exhaust by the at least one carbon dioxide pump 600, as well as small amounts of carbon monoxide, nitrogen, and other impurities. In some embodiments, liquid water from the unpumped effluent may optionally be removed via a water exhaust conduit 601. The remaining unpumped effluent from the at least one carbon dioxide pump 600 may be provided to conduit 603 for recycling to the fuel cell system 30.

In various embodiments, the unpumped effluent from the at least one carbon dioxide pump 600 may include substantially all of the hydrogen and carbon monoxide from the anode exhaust stream. The concentrations of hydrogen and carbon monoxide within the unpumped effluent stream will generally be greater than their concentrations within the anode exhaust stream since most of the carbon dioxide and some of the water from the anode exhaust stream is removed by the at least one carbon dioxide pump 600. This may make the effluent stream in conduit 603 advantageous for use in the fuel cell system 30, including as a fuel source or supplemental fuel for the stacks 102 and/or the ATOs 130. In various embodiments, at least one blower 604 may be in fluid communication with conduit 603. The at least one blower 604 may include any suitable fluid (e.g., gas) blower, pump, compressor, or the like. The at least one blower 604 may compress the effluent stream to a pressure that is suitable for use in the fuel cell system 10. In some embodiments, a plurality of blowers 604 may be utilize to compress portions of the effluent stream to different pressures for different uses in the fuel cell system 10. For example, a first blower 604 in fluid communication with anode recycle conduit(s) 412C may be used to increase the pressure of the effluent stream that is fed to the anode recycle loops of the hot boxes 100 by between 1 psi and 2 psi. At least a portion of the effluent that is provided to the hot boxes 100 may also be provided to the ATOs 130 of the hot boxes 100 for thermal management and/or to remove nitrogen from the ATOs 130. A proportional solenoid valve may be used to control the portion of the effluent that is fed to the ATOs 130 of the respective hot boxes 100. An additional blower 604 in fluid communication with anode recycle conduit 412B may be used to increase the pressure of the effluent stream that is fed to the fuel inlet stream of the fuel cell system 30 by between 10 psi and 15 psi.

In the fuel cell system 30 shown in FIG. 4, since nearly all of the fuel may be recycled, either as a separated carbon dioxide product and/or as recycled fuel for the fuel cell system 30, the per pass fuel utilization of the fuel cell system 30 may be lowered. Further, since any residual $CO_2$ in the effluent stream from the at least one carbon dioxide pump 600 is recycled back through the fuel cell system 30 and eventually to the anode exhaust stream from the hot boxes 100, the at least one carbon dioxide pump 600 does not need to have an extremely high $CO_2$ recovery rate. In some embodiments, the per pass $CO_2$ recovery rate of the at least one carbon dioxide pump 600 may be between 70-90%. This may enable nearly 100% overall $CO_2$ recovery for the fuel cell system 30, minus a small amount of $CO_2$ that may be recycled to and/or generated by the ATOs 130 of the hot boxes 100.

Depending on the CO tolerance of the at least one carbon dioxide pump 600, in some embodiments, the WGS reactor 405 and the anode exhaust conditioning unit 404 may be eliminated from the fuel cell system 30 of FIG. 4. Accordingly, the anode exhaust from the manifold 104 may be fed to the condenser 406 which may be configured to condition the anode exhaust stream such that the temperature and/or water content of the anode exhaust stream may be within the operating range(s) of the at least one carbon dioxide pump 600. In such a case, the anode exhaust stream that enters the at least one carbon dioxide pump 600, as well as the effluent stream from the at least one carbon dioxide pump 600, may have relatively higher concentrations of $H_2$ and CO.

Figure 5:
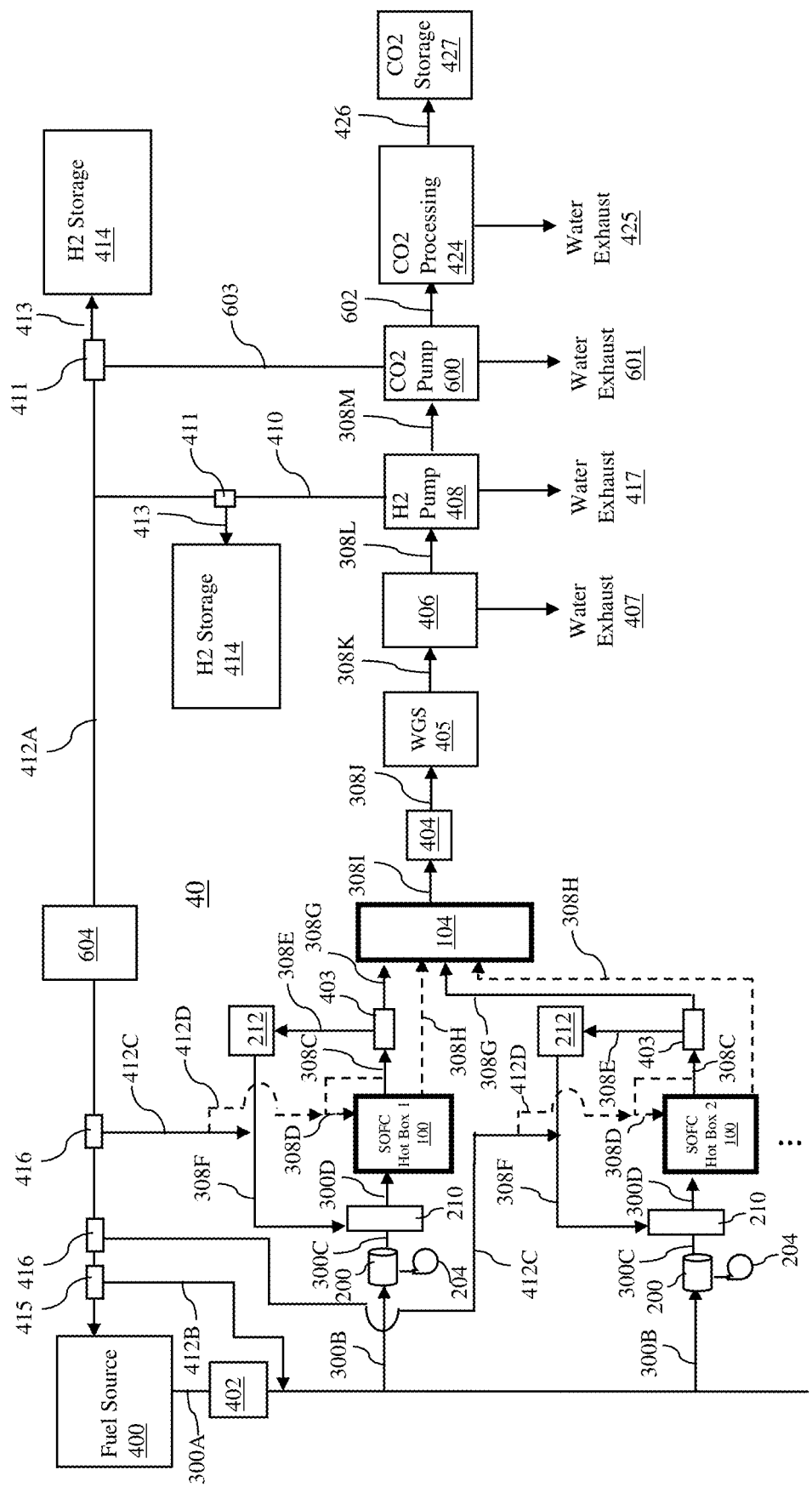
FIG. 5 is a schematic diagram of components of a fuel cell system according to yet another embodiment of the present disclosure.

FIG. 5 schematically illustrates a fuel cell system 40 according to another embodiment of the present disclosure. The fuel cell system 40 of FIG. 5 may be similar to fuel cell system 30 described above with reference to FIG. 4. Thus, repeated discussion of like components is omitted for brevity. The fuel cell system 40 of FIG. 5 may differ from the fuel cell system 30 of FIG. 4 by the addition of at least one hydrogen pump 408 upstream of the at least one carbon dioxide pump 600. In various embodiments, the anode exhaust stream may be provided from condenser 406 to the at least one hydrogen pump 408 via anode exhaust conduit 308L. The at least one hydrogen pump 408 may produce a compressed hydrogen product as described above, which may be provided to conduit 410. The compressed hydrogen product from the at least one hydrogen pump 408 may be recycled to the fuel cell system 30 and/or provided to one or more hydrogen storage containers 414 for storage and potential commercial sale. In the embodiment shown in FIG. 5, a splitter 413 may be used to provide a portion of the compressed hydrogen product to one or more hydrogen storage containers 414 via hydrogen storage conduit 413, while a remaining portion of the compressed hydrogen product may be recycled for use in the fuel cell system via conduit 412A.

The unpumped effluent from the at least one hydrogen pump 408 may contain primarily water (e.g., water vapor and/or liquid water) and carbon dioxide, along with smaller amounts of hydrogen, carbon monoxide, nitrogen, and other impurities. Liquid water from the unpumped effluent may optionally be removed via water exhaust conduit 417. The remaining effluent stream may be provided to the at least one carbon dioxide pump 600 via conduit 308M. The at least one carbon dioxide pump 600 may separate the majority (e.g., 70% or more) of the $CO_2$ from the effluent stream and provide a compressed $CO_2$ product as described above with reference to FIG. 4. The compressed $CO_2$ product may optionally be provided to $CO_2$ processing device 424 via conduit 602.

The unpumped effluent from the at least one carbon dioxide pump 600 may include water (e.g., water vapor and/or liquid water) and carbon dioxide that was not separated by the at least one carbon dioxide pump 600, as well as small amounts of hydrogen, carbon monoxide, nitrogen, and other impurities. Liquid water from the unpumped effluent may optionally be removed via water exhaust conduit 601. The remaining effluent may be provided to conduit 603 to be recycled for use in the fuel cell system 40 as described above.

An advantage of providing at least one hydrogen pump 408 upstream of the at least one carbon dioxide pump 600 is that the at least one hydrogen pump 408 may reduce the gas flow rate of the process stream before it is fed to the at least one carbon dioxide pump 600. In addition, by removing hydrogen using the at least one hydrogen pump 408, the concentration of $CO_2$ in the process stream that is fed to the at least one carbon dioxide pump 600 may be increased. The system 40 of FIG. 5 may also produce a pure or purified hydrogen product, which may be stored for later use and/or sold.

Figure 6:
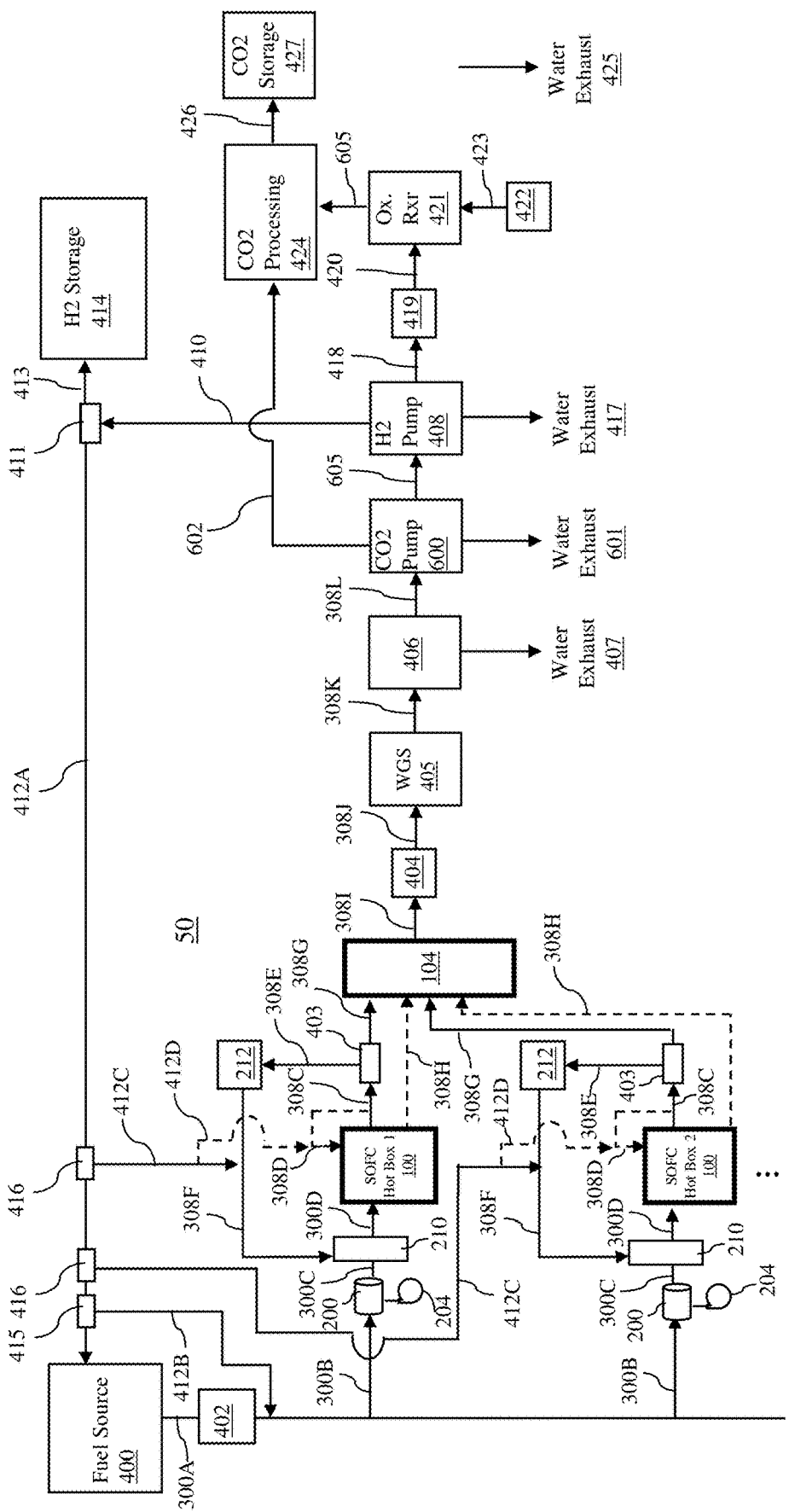
FIG. 6 is a schematic diagram of components of a fuel cell system according to yet another embodiment of the present disclosure.

FIG. 6 schematically illustrates a fuel cell system 50 according to another embodiment of the present disclosure. The fuel cell system 50 of FIG. 5 may be similar to fuel cell system 10 described above with reference to FIG. 2. Thus, repeated discussion of like components is omitted for brevity. The fuel cell system 50 of FIG. 3 may differ from the fuel cell system 10 of FIG. 2 by the addition of at least one carbon dioxide pump 600 upstream of the at least one hydrogen pump 408. In various embodiments, the anode exhaust stream may be provided from condenser 406 to the at least one carbon dioxide pump 600 via anode exhaust conduit 308L. The at least one carbon dioxide pump 600 may separate the majority (e.g., 70% or more) of the $CO_2$ from the anode exhaust stream and provide a compressed $CO_2$ product as described above with reference to FIG. 4. The compressed $CO_2$ product may optionally be provided to $CO_2$ processing device 424 via conduit 602.

The unpumped effluent from the at least one carbon dioxide pump 600 may include a hydrogen-rich process stream including water (e.g., water vapor and/or liquid water), hydrogen, and carbon dioxide that was not separated by the at least one carbon dioxide pump 600, as well as small amounts of carbon monoxide, nitrogen, and other impurities. Liquid water from the unpumped effluent may optionally be removed via water exhaust conduit 601. The remaining effluent may be provided to the at least one hydrogen pump 408 via conduit 604.

The at least one hydrogen pump 408 may produce a compressed hydrogen product as described above, which may be provided to conduit 410. The compressed hydrogen product from the at least one hydrogen pump 408 may be recycled to the fuel cell system 30 and/or provided to one or more hydrogen storage containers 414 for storage and potential commercial sale. In the embodiment shown in FIG. 6, a splitter 411 may be used to provide a portion of the compressed hydrogen product to one or more hydrogen storage containers 414 via hydrogen storage conduit 413, while a remaining portion of the compressed hydrogen product may be recycled for use in the fuel cell system via conduit 412A.

The unpumped gaseous effluent from the at least one hydrogen pump 408 may be provided from the at least one hydrogen pump 408 to effluent conduit 418, and may optionally be fed to a blower 419 and an oxidation reactor 421 configured to reduce or eliminate residual $H_2$ and CO from the effluent prior as described above with reference to FIG. 2. The remaining effluent, which may include primarily water and $CO_2$, may be provided to $CO_2$ processing device 424 via conduit 606 for recovery, storage and/or use of the remaining $CO_2$ as described above.

The preceding description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A fuel cell system comprising:
   at least one hot box comprising a fuel cell stack configured to produce an anode exhaust product;
   at least one hydrogen pump configured to generate a compressed hydrogen product and an unpumped effluent product using the anode exhaust product;
   an oxidation reactor configured to reduce or eliminate residual $H_2$ and CO in the unpumped effluent product;
   at least one product conduit fluidly connecting an anode exhaust product outlet of the hot box to an inlet of the at least one hydrogen pump;
   a compressed hydrogen product conduit connected to a compressed hydrogen product outlet of the at least one hydrogen pump; and
   at least one effluent conduit fluidly connecting an unpumped effluent outlet of the at least one hydrogen pump to the oxidation reactor.

2. The fuel cell system of claim 1, wherein the fuel cell system further comprises a plurality of hot boxes each comprising a fuel cell stack and producing an anode exhaust product, at least one product conduit fluidly connecting an anode exhaust product outlet of each of the plurality of hot boxes to a manifold, and at least one product conduit fluidly connecting an outlet of the manifold to the inlet of the at least one hydrogen pump.

3. The fuel cell system of claim 2, wherein each hot box of the plurality of hot boxes includes a first anode exhaust outlet fluidly connected to the manifold by at least one product conduit, and a second anode exhaust outlet fluidly connected to the manifold by at least one product conduit.

4. The fuel cell system of claim 3, wherein the anode exhaust product that is exhausted from each of the hot boxes through the first anode exhaust outlets comprises anode exhaust that has passed through an anode exhaust cooler of the respective hot boxes, and the anode exhaust product that is exhausted from each of the hot boxes through the second anode exhaust outlets comprises anode exhaust that by-passes the anode exhaust cooler of the respective hot boxes.

5. The fuel cell system of claim 3, further comprising:
   a water gas shift (WGS) reactor, at least one product conduit fluidly connecting an outlet of the manifold to an inlet of the WGS reactor; and
   a condenser, at least one product conduit fluidly connecting an outlet of the WSG reactor to an inlet of the condenser, and at least one product conduit fluidly connecting an outlet of the condenser to the inlet of the at least one hydrogen pump.

6. The fuel cell system of claim 2, wherein the at least one hydrogen pump comprises an electrochemical hydrogen pump which generates a compressed hydrogen product comprising greater than 99 volume percent hydrogen.

7. The fuel cell system of claim 6, wherein the compressed hydrogen product conduit is fluidly connected to at least one hydrogen recycle conduit configured to recycle at least a portion of the compressed hydrogen product for use by the fuel cell system.

8. The fuel cell system of claim 7, wherein the compressed hydrogen product conduit is fluidly connected to at least one hydrogen recycle conduit that is fluidly connected to an anode recycle loop of a hot box of the fuel cell system.

9. The fuel cell system of claim 7, wherein the compressed hydrogen product conduit is fluidly connected to at least one hydrogen recycle conduit that is fluidly connected to an anode tail gas oxidizer (ATO) of a hot box of the fuel cell system.

10. The fuel cell system of claim 7, wherein the compressed hydrogen product conduit is fluidly connected to at least one hydrogen recycle conduit that is fluidly connected to at least one of a fuel source of the fuel cell system and a fuel inlet conduit to one or more hot boxes of the fuel cell system.

11. The fuel cell system of claim 7, wherein the at least one hydrogen recycle conduit is configured to recycle a first portion of the compressed hydrogen product for use by the fuel cell system, and the compressed hydrogen product conduit is fluidly connected to at least one hydrogen storage conduit configured to provide a second portion of the compressed hydrogen product to one or more hydrogen storage containers.

12. The fuel cell system of claim 1, further comprising a blower fluidly connected to the at least one effluent conduit, wherein the blower is configured to compress the unpumped effluent product from the unpumped effluent outlet of the at least one hydrogen pump.

13. The fuel cell system of claim 1, further comprising an anode tail gas oxidizer (ATO) disposed in the at least one hot box, wherein the oxidation reactor is disposed outside of the at least one hot box.

14. The fuel cell system of claim 1, further comprising a carbon dioxide processing device fluidly connected to an outlet of the oxidation reactor by a least one effluent conduit, the carbon dioxide processing device configured to convert the unpumped effluent product into a purified or pure $CO_2$ product.

15. The fuel cell system of claim 1, wherein the fuel cell system comprises a solid oxide fuel cell (SOFC) system.

16. The fuel cell system of claim 1, further comprising at least one carbon dioxide pump, wherein:
   (a) an inlet of the at least one carbon dioxide pump is fluidly connected to the unpumped effluent outlet of the at least one hydrogen pump by at least one unpumped effluent conduit, a compressed carbon dioxide product conduit is connected to a compressed carbon dioxide product outlet of the at least one carbon dioxide pump, and at least one unpumped effluent recycle conduit is coupled to an unpumped effluent outlet of the at least one carbon dioxide pump for recycling unpumped effluent from the at least one carbon dioxide pump for use in the fuel cell system, or
   (b) at least one product conduit fluidly connects the anode exhaust product outlet of the hot box to an inlet of the at least one carbon dioxide pump, a compressed carbon dioxide product conduit is connected to a compressed carbon dioxide product outlet of the at least one carbon dioxide pump, and at least one unpumped effluent recycle conduit is coupled to an unpumped effluent outlet of the at least one carbon dioxide pump for providing unpumped effluent from the at least one carbon dioxide pump to the inlet of the at least one hydrogen pump.

17. A fuel cell system comprising:
   at least one hot box comprising a fuel cell stack configured to produce an anode exhaust product;
   a lower pressure hydrogen pump, at least one product conduit fluidly connected to an inlet of the lower pressure hydrogen pump for receiving a first portion of the anode exhaust product, wherein compressed hydrogen product produced by the lower pressure hydrogen pump is recycled for use in the fuel cell system;
   a higher pressure hydrogen pump, at least one at least one product conduit fluidly connected to an inlet of the higher pressure hydrogen pump for receiving a second portion of the anode exhaust product, wherein compressed hydrogen product produced by the higher pressure hydrogen pump is provided to one or more hydrogen storage containers;
   at least one hydrogen pump configured to generate a compressed hydrogen product and an unpumped effluent product using the anode exhaust product;
   an oxidation reactor configured to reduce or eliminate residual $H_2$ and CO in the unpumped effluent product;
   at least one product conduit fluidly connecting an anode exhaust product outlet of the hot box to an inlet of the at least one hydrogen pump;
   a compressed hydrogen product conduit connected to a compressed hydrogen product outlet of the at least one hydrogen pump; and
   at least one effluent conduit fluidly connecting an unpumped effluent outlet of the at least one hydrogen pump to the oxidation reactor.

18. A fuel cell system comprising:
   at least one hot box comprising a fuel cell stack configured to produce an anode exhaust product;

at least one carbon dioxide pump configured to remove at least about 70% of the carbon dioxide from the anode exhaust product to generate a compressed carbon dioxide product and to generate an unpumped effluent product;

an oxidation reactor disposed outside of the at least one hot box and configured to reduce or eliminate residual $H_2$ and CO in the unpumped effluent product;

at least one product conduit fluidly connecting an anode exhaust product outlet of the hot box to an inlet of the at least one carbon dioxide pump;

a compressed carbon dioxide product conduit connected to a compressed carbon dioxide product outlet of the at least one carbon dioxide pump; and at least one effluent conduit fluidly connecting an unpumped effluent outlet of the at least one carbon dioxide pump to the oxidation reactor.

19. A method of operating a fuel cell system, comprising:

providing a fuel inlet stream to at least one hot box of the fuel cell system;

generating an anode exhaust product stream from the at least one hot box of the fuel cell system;

providing the anode exhaust product stream to at least one hydrogen pump;

generating a compressed hydrogen product and an unpumped effluent product in the at least one hydrogen pump; and recycling at least a portion of the compressed hydrogen product to the at least one hot box of the fuel cell system; and providing the unpumped effluent product to an oxidation reactor to reduce or eliminate residual hydrogen content from the unpumped effluent product that is compressed by the blower.

20. The method of claim 19, further comprising at least one of:

producing a purified or pure $CO_2$ product from the unpumped effluent product from the at least one hydrogen pump, and providing a portion of the compressed hydrogen product to at least one hydrogen storage container, wherein the oxidation reactor is disposed outside of the at least one hot box.

* * * * *

UNITED STATES PATENT AND TRADEMARK OFFICE
CERTIFICATE OF CORRECTION

| | | |
|---|---|---|
| PATENT NO. | : 12,095,124 B2 | |
| APPLICATION NO. | : 17/938718 | |
| DATED | : September 17, 2024 | |
| INVENTOR(S) | : David Weingaertner et al. | |

It is certified that error appears in the above-identified patent and that said Letters Patent is hereby corrected as shown below:

In the Claims

At Column 20, Line 12, Claim 19, replace "by the blower" with --by a blower--

Signed and Sealed this
Twenty-ninth Day of October, 2024

Katherine Kelly Vidal
*Director of the United States Patent and Trademark Office*